United States Patent
Wu (10) Patent No.: US 9,538,371 B2
(45) Date of Patent: Jan. 3, 2017

(54) METHOD OF HANDLING DATA TRANSMISSION AND RECEPTION IN DEVICE TO DEVICE COMMUNICATION IN WIRELESS COMMUNICATION SYSTEMS

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 183 days.

(21) Appl. No.: 14/327,557

(22) Filed: Jul. 9, 2014

(65) Prior Publication Data

US 2015/0016611 A1 Jan. 15, 2015

Related U.S. Application Data

(60) Provisional application No. 61/844,441, filed on Jul. 10, 2013.

(51) Int. Cl.
*H04W 12/04* (2009.01)
*H04W 76/04* (2009.01)
*H04W 12/02* (2009.01)

(52) U.S. Cl.
CPC ............ *H04W 12/04* (2013.01); *H04W 12/02* (2013.01); *H04W 76/043* (2013.01)

(58) Field of Classification Search
CPC ..... H04W 12/02; H04W 12/04; H04W 76/043
USPC ........................................................ 380/270
See application file for complete search history.

(56) References Cited

U.S. PATENT DOCUMENTS

2011/0103240 A1  5/2011  Taghavi Nasrabadi

OTHER PUBLICATIONS

3GPP TR 23.703 V0.4.1(Jun. 2013), "3rd Generation Partnership Project; Technical Specification Group Services and System Aspects; Study on architecture enhancements to support Proximity Services (ProSe) (Release 12)", pp. 1-85.
3GPP TS 36.331 v11.3.0(Mar. 2013), "3rd Generation Partnership Project; Technical Specification Group Radio Access Network; Evolved Universal Terrestrial Radio Access (E-UTRA); Radio Resource Control (RRC); Protocol specification (Release 11)", pp. 1-344.

(Continued)

*Primary Examiner* — Kambiz Zand
*Assistant Examiner* — Benjamin Kaplan
(74) *Attorney, Agent, or Firm* — Winston Hsu; Scott Margo (57) ABSTRACT

A method of handling data transmission and reception in device to device communication for a first communication device in a wireless communication system is disclosed. The method comprises connecting to a network of the wireless communication system, using a first ciphering key to cipher a first plurality of data blocks in a communication path corresponding to the second communication device, wherein the communication path is used for transmitting the first plurality of data blocks to the second communication device and is not traversing the network, being configured to release the communication path by the network, and using a second ciphering key different to the first ciphering key to cipher a second plurality of data blocks in a connection corresponding to the network, wherein the second plurality of data blocks include data transmitted to the second communication device.

15 Claims, 5 Drawing Sheets

Proximity service direct communication (56) References Cited

OTHER PUBLICATIONS

3GPP TS 36.323 V11.2.0(Mar. 2013), "3rd Generation Partnership Project; Technical Specification Group Radio Access Network; Evolved Universal Terrestrial Radio Access (E-UTRA); Packet Data Convergence Protocol (PDCP) specification (Release 11)", pp. 1-27.
European Search report issued on Feb. 10, 2015 for EP application No. 14176528.9.
Office action mailed on Feb. 17, 2015 for the European application No. 14176528.9, p. 1-6.
Suman Khakurel et al., "Security Vulnerabilities in IEEE 802.11 and Adaptive Encryption Technique for Better Performance", Oct. 3-5, 2010, pp. 207-210, Industrial Electronics&Applications(ISIEA), 2010 IEEE Symposium on, IEEE, Piscataway, NJ, USA, XP031843187.
3GPP TS 33.102 V11.5.1 (Jun. 2013), "3rd Generation Partnership Project; Technical Specification Group Services and System Aspects; 3G Security; Security architecture (Release 11)", XP050711975, pp. 1-76.
ETSI TS 136 323 V11.2.0 (Apr. 2013), "LTE; Evolved Universal Terrestrial Radio Access (E-UTRA); Packet Data Convergence Protocol (PDCP) specification (3GPP TS 36.323 version 11.2.0 Release 11)", XP014156766, pp. 1-29.

METHOD OF HANDLING DATA TRANSMISSION AND RECEPTION IN DEVICE TO DEVICE COMMUNICATION IN WIRELESS COMMUNICATION SYSTEMS

CROSS REFERENCE TO RELATED APPLICATIONS

This application claims the benefit of U.S. Provisional Application No. 61/844,441, filed on Jul. 10, 2013 and entitled "Method and Apparatus for handling device to device communication in a wireless communication system", the contents of which are incorporated herein in their entirety.

BACKGROUND OF THE INVENTION

1. Field of the Invention

The present invention relates to a method used in a communication device in a wireless communication system, and more particularly, to a method of handling data transmission and reception in device to device communication in a wireless communication system.

2. Description of the Prior Art

In many communication systems, there are usually at least one kind of nodes serving for central control of radio resource and other kinds of nodes serving for user usage by means of connecting at least a serving node. In 3GPP LTE system of wireless communication system, for example, the mentioned nodes serving for central control are eNBs, relay nodes, radio remote heads (RRH), remote antennas, base stations, etc. Those nodes serving for user usage can be UEs, mobile stations, handsets, user devices, machine type devices (i.e. having capability of communicating with other devices without users), etc.

New direct communications between two user devices are different from conventional communication through eNB. This kind of device to device communication is new in wireless communication systems, and there is few information so far. Some similar but different behaviors could be found in Bluetooth and WiFi. However, for those skilled in the art should know these two systems are different from communication systems with central control, e.g. LTE, LTE-Advanced, WCDMA, HSPA, WiMAX, etc. Note that, in current wireless communication systems with central control, two communication devices (i.e. two UEs) use a proximity service direct communication mechanism for communication by means of user plane transmission using E-UTRA technology via a path not traversing any network node (i.e. an eNB). In a word, with the proximity service direct communication, a first UE can perform data transmission/reception to a second UE, wherein the first UE and the second UE are both proximity service direct communication enabled.

However, the applicant notice a problem associated to the proximity service direct communication. Consider a scenario that the first UE is configured proximity service direct communication to the second UE. The first UE has a RRC connection with a first eNB. The second UE has a RRC connection with the first eNB or a second eNB. It is not clear how to handle data transmission and reception between the first UE and the second UE if the proximity service direct communication is terminated e.g. due to reconfiguration or radio link failure.

Moreover, after RRC reconfiguration or radio link failure, the UE may perform Packet Data Convergence Protocol (PDCP) re-establishment. In addition, the UE shall reset the header compression protocol, apply the ciphering algorithm and key provided by upper layers during the PDCP re-establishment, set Next_PDCP_TX_SN and TX_HFN to 0 for an uplink data transfer procedure, and set Next_PDCP_RX_SN and RX_HFN to 0 for a downlink data transfer procedure. Furthermore, when the UE performs the PDCP re-establishment, for radio bearers that are mapped on RLC AM, the UE shall if the radio bearer is configured by upper layers to send a PDCP status report in the uplink, compile a status report after processing the PDCP data PDUs that are received from lower layers due to the re-establishment of the lower layers, and submit it to lower layers as the first PDCP PDU for the transmission.

Based on the abovementioned specification, the applicant has what ciphering algorithm and key, PDCP parameter setting, status report, and etc. in mind for data transmission and reception between the first UE and the second UE if the proximity service direct communication is terminated.

SUMMARY OF THE INVENTION

It is there for an objective to provide a method of handing data transmission and reception in device to device communication in a wireless communication system to solve the above problem.

The present invention discloses a method of handling data transmission and reception in device to device communication for a first communication device in a wireless communication system. The method comprises connecting to a network of the wireless communication system, using a first ciphering key to cipher a first plurality of data blocks in a communication path corresponding to the second communication device, wherein the communication path is used for transmitting the first plurality of data blocks to the second communication device and is not traversing the network, being configured to release the communication path by the network, and using a second ciphering key different to the first ciphering key to cipher a second plurality of data blocks in a connection corresponding to the network, wherein the second plurality of data blocks include data transmitted to the second communication device.

The present invention discloses a method of handling data transmission and reception in device to device communication for a first communication device in a wireless communication system. The method comprises connecting to a first network of the wireless communication system, using a first ciphering key to decipher a first plurality of data blocks in a communication path corresponding to the second communication device, wherein the communication path is used for receiving the first plurality of data blocks from the second communication device and is not traversing the first network, being configured to release the communication path by the first network, and using a second ciphering key to decipher a second plurality of data blocks in a connection corresponding to the first network, wherein the second plurality of data blocks includes data transmitted from the second communication device, wherein the second ciphering key is different to the first ciphering key.

The present invention discloses a method of handling data transmission and reception in device to device communication for a first network in a wireless communication system. The method comprises connecting to a first communication device of the wireless communication system, and configuring the first communication device to transmit a measurement report to the first network, wherein the measurement report is associated to a measurement on a signal transmitted from a second communication device of the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
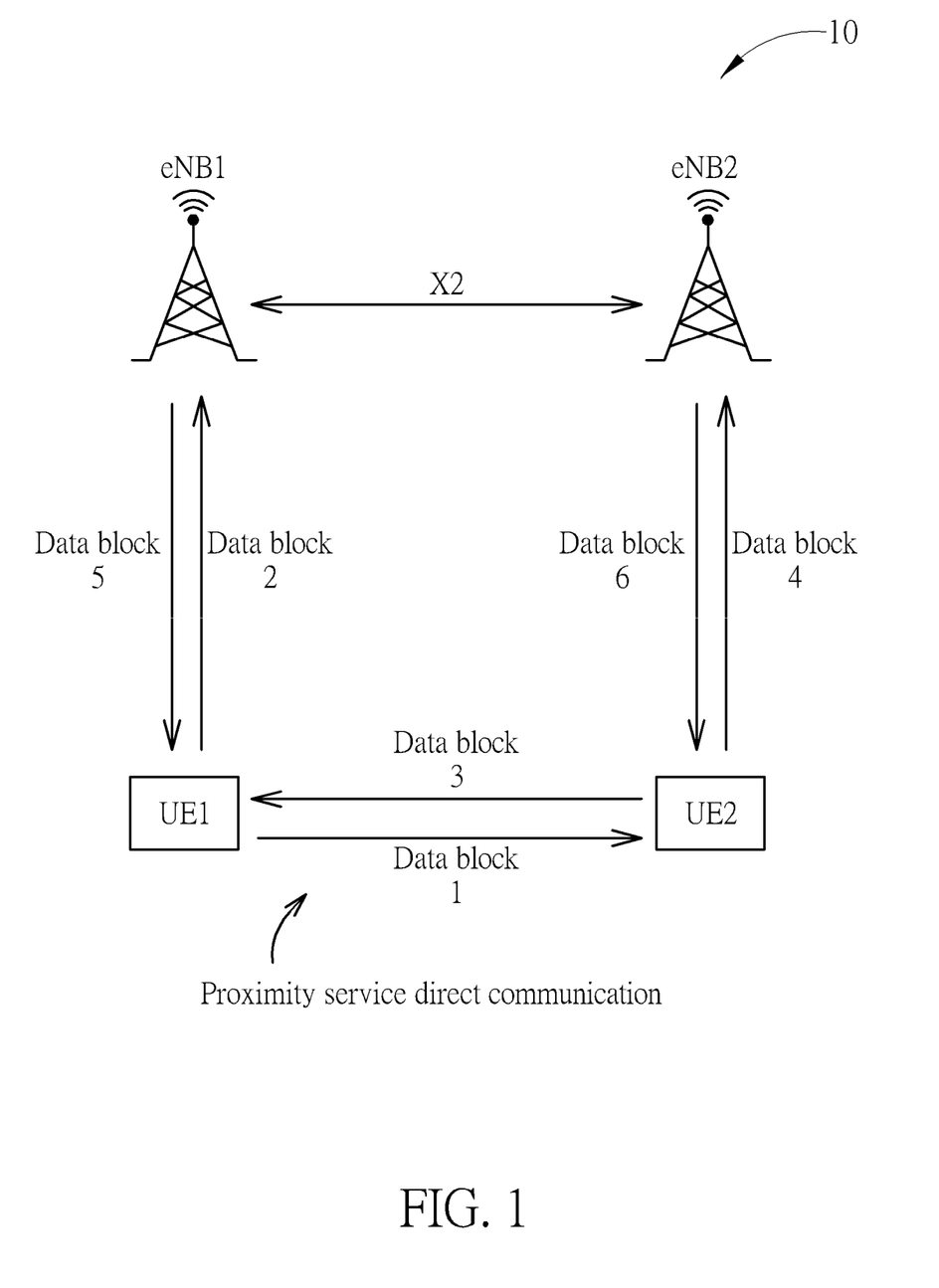
FIG. 1 illustrates a schematic diagram of an exemplary wireless communication system.

Please refer to FIG. 1, which is a schematic diagram of a wireless communication system 10. The wireless communication system 10 is a LTE/LTE-Advanced system or other mobile communication systems, and is briefly composed of at least a network node, i.e. an evolved node B (eNB), and at least two user equipments (UEs) UE1 and UE2. Note that, FIG. 1 is simply utilized for illustrating the structure of the wireless communication system 10, where the number of UEs and eNBs are not limited herein. For example, there are two eNBs eNB1 and eNB2 shown in FIG. 1. The UEs can be devices such as mobile phones, computer systems, machine type devices, etc. Besides, the network node and the UE can be seen as a transmitter or receiver according to transmission direction, e.g., for uplink (UL), the UE is the transmitter and the network is the receiver, and for downlink (DL), the network is the transmitter and the UE is the receiver.

As shown in FIG. 1, the UE1 has a first radio resource control (RRC) connection with the eNB1, and the UE2 has a second RRC connection with the eNB2. The eNB1 and eNB2 configure UE1 and UE2 to use proximity service direct communication for data transmission and reception to each other. The proximity service direct communication is realized by means of user plane transmission using E-UTRA technology via a path not traversing eNB1 and eNB2. In an embodiment, the first RRC connection includes at least one signaling radio bearer (SRB) and the second RRC connection includes at least one SRB.

Figure 2:
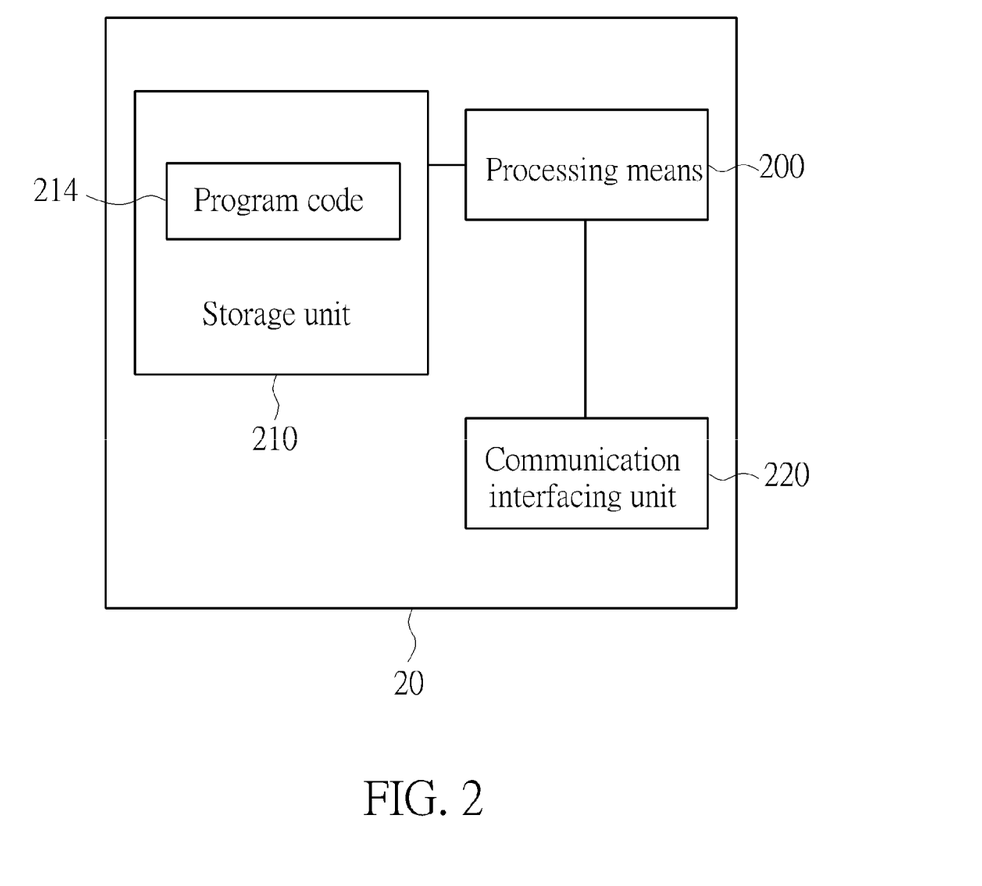
FIG. 2 illustrates a schematic diagram of an exemplary communication device.

FIG. 2 illustrates a schematic diagram of an exemplary communication device 20. The communication device 20 can be the UE or eNB shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
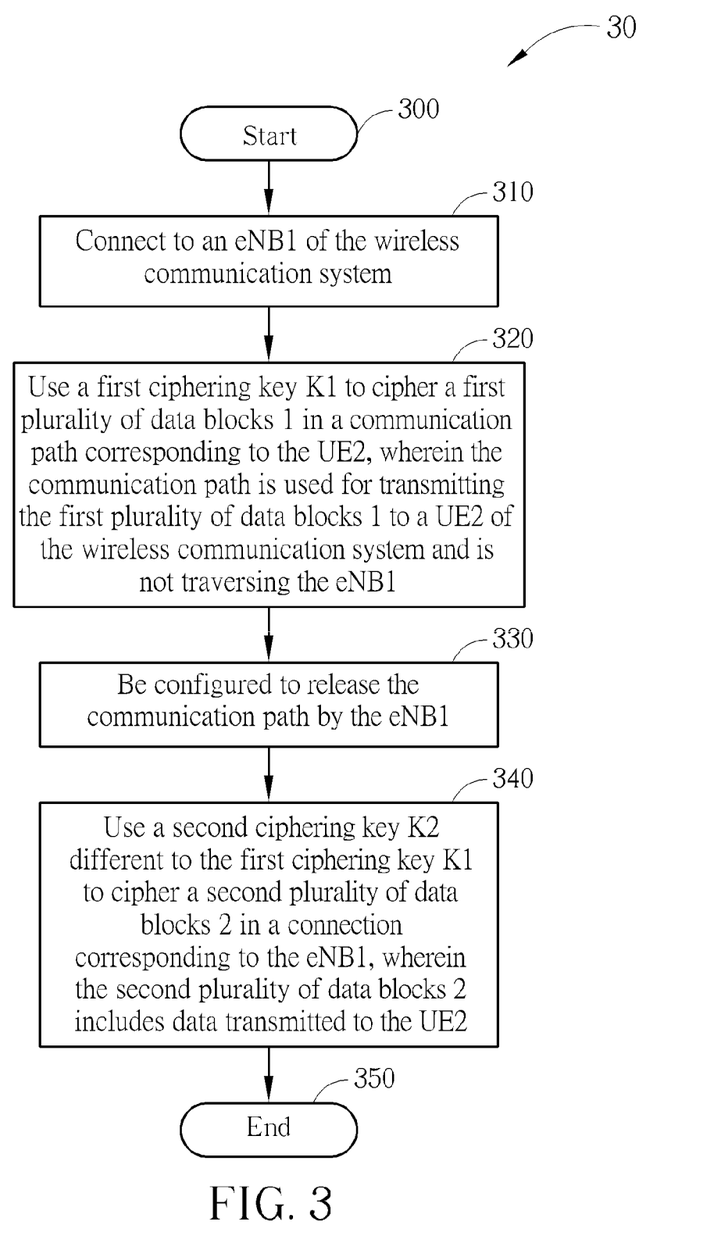
FIGS. 3-5 are flowcharts of an exemplary process according to the present disclosure.

Please refer to FIG. 3, which is a flowchart of a process 30 according to an example of the present disclosure. The process 30 is utilized in the communication device 20 (i.e. the UE1) for data transmission in device to device communication. The process 30 may be compiled into a program code 214 to be stored in the storage unit 210, and may include the following steps:

Step 300: Start.

Step 310: Connect to an eNB1 of the wireless communication system.

Step 320: Use a first ciphering key K1 to cipher a first plurality of data blocks 1 in a communication path corresponding to the UE2, wherein the communication path is used for transmitting the first plurality of data blocks 1 to a UE2 of the wireless communication system and is not traversing the eNB1.

Step 330: Be configured to release the communication path by the eNB1.

Step 340: Use a second ciphering key K2 different to the first ciphering key K1 to cipher a second plurality of data blocks 2 in a connection corresponding to the eNB1, wherein the second plurality of data blocks 2 includes data transmitted to the UE2.

Step 350: End.

According to the process 30, the UE1 uses a first ciphering key K1 to cipher the first plurality of data blocks 1 in the proximity service direct communication. However, if the eNB1 reconfigures the UE1 to release the proximity service direct communication, the UE1 uses a second ciphering key K2, which is different from the first ciphering key K1, to cipher the second plurality of data blocks 2 in the connection corresponding to the eNB1. The main idea in the present disclosure is that the UE should use different ciphering keys in the proximity service direct communication to other UE and in the connection to the eNB. In other words, the eNB should enable the UE to use different ciphering keys in the proximity service direct communication to other UE and in the connection to the eNB.

In detail, please refer back to FIG. 1. The eNB1 configures UE1 using proximity service direct communication with UE2. The UE1 transmits a first plurality of data blocks 1 ciphered with a first ciphering key K1 to the UE2 in the proximity service direct communication. The UE2 receives the first plurality of ciphered data blocks 1 and deciphers the first plurality of ciphered data blocks 1 with the first ciphering key K1. The eNB1 reconfigures the UE1 to release the proximity service direct communication and to communicate with the eNB1 directly by sending a first RRC message to the UE1. After reconfiguration, the UE1 directly transmits a second plurality of data blocks 2 ciphered with a second ciphering key K2 to the eNB1. Note that, the second ciphering key K2 is different to the first ciphering key K1.

In addition, the eNB1 receives the second plurality of data blocks 2 and deciphers the second plurality of ciphered data blocks 2 with the second ciphering key K2. The eNB1 may further transmit the second plurality of data blocks 2 to the eNB2, and therefore the eNB2 transmits the second plurality of data blocks 2 ciphered with a ciphering key to the UE2. The UE2 deciphers the second plurality of ciphered data blocks with the ciphering key.

On the other hand, the eNB1 ciphers data blocks for transmitting to the UE1 with the second ciphering key K2, and therefore the UE1 deciphers the ciphered data blocks received from the eNB1 with the second ciphering key K2.

The abovementioned data blocks may be PDCP SDUs. In an embodiment, the first plurality of data blocks 1 and the second plurality of data blocks 2 are transmitted by a PDCP entity of the UE1. In this case, after reconfiguration, the UE1 sets Next_PDCP_TX_SN and TX_HFN of the PDCP entity to initial values (e.g. 0), wherein the PDCP entity transmits the first plurality of data blocks 1 to the UE1. After setting, the PDCP entity of the UE1 ciphers the second plurality of data blocks 2 with the Next_PDCP_TX_SN and TX_HFN and transmits the second plurality of ciphered data blocks 2 to the eNB1.

In other embodiment, the first plurality of ciphered data blocks is transmitted by a first PDCP entity of the UE1 and the second plurality of ciphered data blocks is transmitted by a second PDCP entity of the UE1, wherein the first PDCP entity is released and the second PDCP entity is established in response to reconfiguration. In detail, the eNB1 can configure the UE1 to release a first DRB utilizing the first PDCP entity and then add a second DRB utilizing the second PDCP entity, wherein the first DRB and the second DRB are associated to an EPS bearer. In other words, the first DRB is replaced by the second DRB.

Moreover, if header compression is configured before and after reconfiguration, in response to reconfiguration due to receiving the first message, the UE1 resets header compression protocol of the PDCP entity which performs header compression to the first plurality of data blocks 1, ciphers the first plurality of header compressed data blocks 1 with the first ciphering key K1 and then transmits the first plurality of ciphered data blocks 1 to the UE2. After resetting, the PDCP entity of the UE1 performs header compression to the second plurality of data blocks 2, ciphers the second plurality of header compressed data blocks 2 with the second ciphering key K2 and then transmits the second plurality of ciphered data blocks 2 to the eNB1.

Note that, process 30 and the abovementioned operation (i.e. header compression protocol resetting or PDCP parameter setting due to reconfiguration) could be applied to the UE2. For example, the UE2 ciphers a third plurality of data blocks 3 for transmission to the UE1 with a third ciphering key K3 and transmits the third plurality of ciphered data blocks 3 in the proximity service direct communication. The UE1 receives the third plurality of ciphered data blocks 3 and deciphers the third plurality of ciphered data blocks 3 with the third ciphering key K3, wherein the third ciphering key K3 is same as the first ciphering key K1 or different to the second ciphering key K2. In addition, the eNB2 reconfigures the UE2 to release the proximity service direct communication and to communicate with the eNB2 directly by sending a second RRC message to the UE2. It is noted that the eNB1 and eNB2 can be the same eNB or different eNBs. If the eNB1 and eNB2 are different eNBs, the eNB1 indicates to the eNB2 to release the proximity service direct communication. Then, the eNB2 transmits the second RRC message to the UE2. After reconfiguration due to receiving the second RRC message, the UE2 transmits a fourth plurality of ciphered data blocks 4 to the eNB2, wherein the fourth plurality of ciphered data blocks 4 are ciphered by a fourth ciphering key K4, which is different to the third ciphering key K3.

In addition, the eNB2 receives the fourth plurality of data blocks 4 and deciphers the fourth plurality of ciphered data blocks 4 with the fourth ciphering key K4. The eNB2 may further transmit the fourth plurality of data blocks 4 to the eNB1, and therefore the eNB1 transmits the fourth plurality of data blocks 4 with a ciphering key to the UE1. The UE1 deciphers the fourth plurality of ciphered data blocks with the ciphering key.

On the other hand, the eNB2 ciphers data blocks for transmitting to the UE2 with the fourth ciphering key K4, and therefore the UE2 deciphers the ciphered data blocks received from the eNB2 with the fourth ciphering key K4.

In addition, in response to the reconfiguration, the UE2 resets header compression protocol of a PDCP entity which performs header compression to the third plurality of data blocks 3 and transmits the third plurality of ciphered data blocks 3 to the UE1, if the header compression is configured before and after reconfiguration. After resetting, the PDCP entity of the UE2 performs header compression to the fourth plurality of data blocks 4, ciphers the fourth plurality of header compressed data blocks 4 with the fourth ciphering key K4 and then transmits the fourth plurality of ciphered data blocks 4 to the eNB2. Moreover, in response to the reconfiguration, the UE2 sets Next_PDCP_TX_SN and TX_HFN of the PDCP entity to initial values (e.g. 0), wherein the PDCP entity transmits the third plurality of data blocks 3 to the UE1. After setting, the PDCP entity of the UE2 ciphers the fourth plurality of header compressed data blocks with the Next_PDCP_TX_SN and TX_HFN and transmits the fourth plurality of ciphered data blocks 4 to the eNB2.

The abovementioned first RRC message or second RRC message is an RRCConnectionReconfiguration message or a newly defined RRC message.

The abovementioned ciphering is done by a ciphering algorithm with the abovementioned ciphering key. The abovementioned ciphering key used for data transmission between UE and eNB may be derived from a base-station-level key $K_{eNB}$, wherein the base-station-level key $K_{eNB}$ key is derived from an intermediate key $K_{ASME}$ or derived from another base-station-level key $K_{eNB}$ or Next Hop (NH). The abovementioned ciphering key used for data transmission between UEs in the proximity service direct communication may be a same key shared by the UEs, which may be derived from an algorithm with same system time known by UEs and/or another same digits (e.g. a session key or a counter value) configured by an eNB to the UEs.

Figure 4:
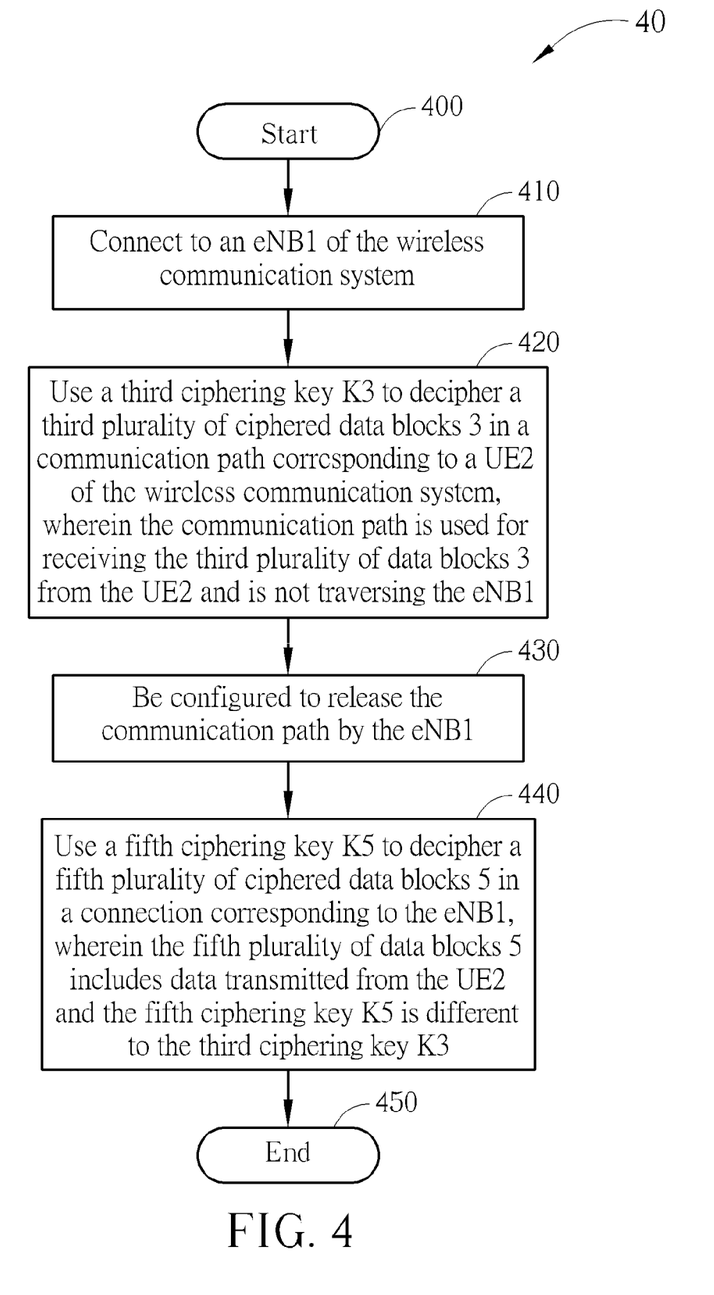

Please refer to FIG. 4, which is a flowchart of a process 40 according to an example of the present disclosure. The process 40 is utilized in the communication device 20 (i.e. the UE1) for data reception in device to device communication. The process 40 may be compiled into a program code 214 to be stored in the storage unit 210, and may include the following steps:

Step 400: Start.

Step 410: Connect to an eNB1 of the wireless communication system.

Step 420: Use a third ciphering key K3 to decipher a third plurality of ciphered data blocks 3 in a communication path corresponding to a UE2 of the wireless communication system, wherein the communication path is used for receiving the third plurality of data blocks 3 from the UE2 and is not traversing the eNB1.

Step 430: Be configured to release the communication path by the eNB1.

Step 440: Use a fifth ciphering key K5 to decipher a fifth plurality of ciphered data blocks 5 in a connection corresponding to the eNB1, wherein the fifth plurality of data blocks 5 includes data transmitted from the UE2 and the fifth ciphering key K5 is different to the third ciphering key K3.

Step 450: End.

According to the process 40, the UE1 uses a third ciphering key K3 to decipher the third plurality of ciphered data blocks 3 in the proximity service direct communication. However, if the eNB1 reconfigures the UE1 to release the proximity service direct communication, the UE1 uses a fifth ciphering key K5 different to the third ciphering key K3 to decipher the fifth plurality of ciphered data blocks 5 in the connection to the eNB1. The main idea in the present disclosure is that the UE should use different ciphering keys in the proximity service direct communication to other UE and in the connection to the eNB.

In an embodiment, after reconfiguration, the UE1 sets Next_PDCP_RX_SN and RX_HFN of a PDCP entity of the UE1 to initial values (e.g. 0), wherein the PDCP entity receives the third plurality of data blocks 3 from the UE2. After setting, the PDCP entity of the UE1 receives the fifth plurality of ciphered data blocks 5 from the eNB1 and deciphers the fifth plurality of ciphered data blocks 5 with the Next_PDCP_RX_SN and RX_HFN, wherein the fifth plurality of data blocks 5 contains data transmitted from the UE2.

In an embodiment, in response to the reconfiguration, the UE1 resets header compression protocol of the PDCP entity which performs header decompression to the third plurality of data blocks 3. After resetting, the PDCP entity of the UE1 receives the fifth plurality of ciphered data blocks 5 from the eNB1, deciphers the fifth plurality of ciphered data blocks 5 and performs header decompression to the fifth plurality of data blocks 5.

Further, the UE1 transmits a first status report to the eNB1, wherein the first status report contains information indicating which data blocks are not received successfully before reconfiguration. If the eNB1 and the eNB2 are different eNBs, the eNB1 transmits the first status report to the eNB2, and then the eNB2 transmits the first status report or a second status report containing the information to the UE2. If the eNB1 and the eNB2 are the same eNB, the eNB1 transmits the first status report or the second status report to the UE2. After receiving the status report, the UE2 transmits the fourth plurality of data blocks 4 containing at least one data block belonging to the third plurality of data blocks to the eNB2, wherein the at least one data block has not been successfully received by the UE1. As a result, the eNB2 transmits the fourth plurality of data blocks 4 to the UE1 with eNB1 assistance.

The abovementioned first status report and the second status report are PDCP status reports if the data blocks are PDCP SDUs.

Note that, process 40 and the abovementioned operation (i.e. header compression protocol resetting, PDCP parameter setting due to reconfiguration, and PDCP status report) could be applied for the UE2. The detailed description can be referred from above.

Figure 5:
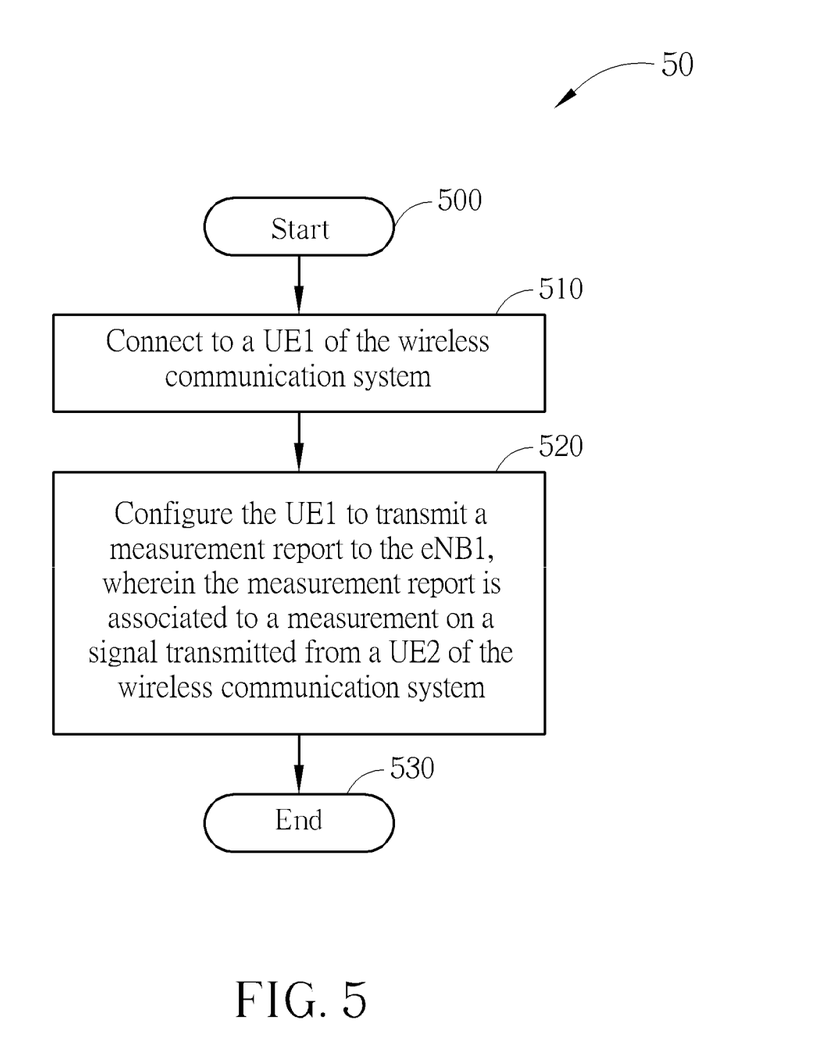

Please refer to FIG. 5, which is a flowchart of a process 50 according to an example of the present disclosure. The process 50 is utilized in the network (i.e. eNB1) for data transmission in device to device communication. The process 50 may be compiled into a program code 214 to be stored in the storage unit 210, and may include the following steps:

Step 500: Start.

Step 510: Connect to a UE1 of the wireless communication system.

Step 520: Configure the UE1 to transmit a measurement report to the eNB1, wherein the measurement report is associated to a measurement on a signal transmitted from a UE2 of the wireless communication system.

Step 530: End.

According to the process 50, the eNB1 configures the UE1 to transmit measurement report containing at least one of event and signal quality (e.g. RSRP or RSRQ or both) to the eNB1, wherein the at least one of signal quality is derived from measurements that the UE1 performs on signal transmitted by the UE2, and the event is that the signal quality is below a certain threshold value. As a result, the eNB1 can determine whether to reconfigure the UE1 to release the proximity service direct communication according to the measurement report received from the UE1.

In an embodiment, the UE1 may be configured by the eNB1 to transmit the periodically or when the event occurs. In response to the measurement report received from the UE1, the eNB1 reconfigures the UE1 to release the proximity service direct communication and to communicate with the eNB1 directly by sending the abovementioned first RRC message to the UE1. In other words, when the eNB1 receives the event and/or signal quality, the eNB1 knows that signal quality in the proximity service direct communication is bad, the eNB1 determines to release the proximity service direct communication and configures the UE1 to communicate with the eNB1 directly.

Similarly, process 50 could be applied to the eNB2. Thus, the UE2 reports the measurement on the signal transmitted from the UE1 to the eNB2, so that the eNB2 determines whether to reconfigure the UE2 to release the proximity service direct communication according to the measurement report received from the UE2. The detailed description can be referred from above.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention provides a clear specification for data transmission in device to device communication in wireless communication system. The UE uses different cipher key to cipher/decipher data blocks in the connection to the eNB and in the proximity service direct communication. Moreover, the UE is configured to report the measurement on the signal transmitted from the other UE, to the eNB.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling data transmission and reception in device to device communication for a first communication device in a LTE or LTE-Advanced wireless communication system, comprising:
   connecting to a network of the wireless communication system;
   using a first ciphering key to cipher a first plurality of data blocks in a communication path corresponding to a second communication device, wherein the communication path is used for transmitting the first plurality of data blocks to the second communication device and is not traversing the network;
   being configured to release the communication path by the network; and
   using a second ciphering key different to the first ciphering key to cipher a second plurality of data blocks in a connection corresponding to the network, wherein the connection is used for transmitting the second plurality of data blocks to the second communication device and is traversing the network.

2. The method of claim 1, wherein the first ciphering key is further used for deciphering ciphered data blocks received from the second communication device.

3. The method of claim 1, wherein being configured to release the communication path by the network comprises:
receiving a first message for reconfiguring the first communication device to release the communication path, from the network.

4. The method of claim 1, further comprising:
transmitting the first plurality of ciphered data blocks by a packet data convergence protocol (PDCP) entity of the first communication device;
setting Next_PDCP_TX_SN and TX_HFN of the PDCP entity to initial values when the first communication device is configured to release the communication path; and
ciphering the second plurality of data blocks with the Next_PDCP_TX_SN and TX_HFN and transmitting the second plurality of ciphered data blocks by the PDCP entity of the first communication device, after setting.

5. The method of claim 1, further comprising:
transmitting the first ciphered plurality of data blocks by a first data radio bearer (DRB) utilizing a first PDCP entity of the first communication device;
releasing the first DRB when the first communication device is configured to release the communication path;
establishing a second DRB utilizing a second PDCP entity of the first communication device; and
transmitting the second plurality of ciphered data blocks by the second DRB of the second PDCP entity of the first communication device.

6. The method of claim 1, further comprising:
performing a first header compression to the first plurality of data blocks by a PDCP entity of the first communication device;
resetting header compression protocol of the PDCP entity when the first communication device is configured to release the communication path; and
performing a second header compression to the second plurality of data blocks by the PDCP entity of the first communication device after resetting.

7. The method of claim 1, further comprising:
being configured to transmit a measurement report to the network, wherein the measurement report is associated to a measurement on a signal transmitted from the second communication device, wherein the measurement report includes at least one of signal quality derived from a measurement that the first communication device performs on a signal transmitted from the second communication device and an event that the signal quality is below a certain threshold value.

8. The method of claim 7, further comprising:
transmitting the measurement report to the network periodically; or
transmitting the measurement report to the network when the event occurs.

9. A method of handling data transmission and reception in device to device communication for a first communication device in a LTE or LTE-Advanced wireless communication system, comprising:
connecting to a first network of the wireless communication system;
using a first ciphering key to decipher a first plurality of ciphered data blocks in a communication path corresponding to a second communication device, wherein the communication path is used for receiving the first plurality of ciphered data blocks from the second communication device and is not traversing the first network;
being configured to release the communication path by the first network; and
using a second ciphering key to decipher a second plurality of ciphered data blocks in a connection corresponding to the first network, wherein the connection is used for receiving the second plurality of ciphered data blocks from the second communication device and is traversing the first network;
wherein the second ciphering key is different from the first ciphering key.

10. The method of claim 9, wherein being configured to release the communication path corresponding to the second communication device by the first network comprises:
receiving a first message for reconfiguring the first communication device to release the communication path, from the first network.

11. The method of claim 9, wherein the first ciphering key is further used for ciphering data blocks transmitted to the second communication device.

12. The method of claim 11, further comprising:
being configured to transmit a measurement report to the first network, wherein the measurement report is associated to a measurement on a signal transmitted from the second communication device, wherein the measurement report includes at least one of signal quality derived from a measurement that the first communication device performs on a signal transmitted from the second communication device and an event that the signal quality is below a certain threshold value; and
transmitting the measurement report to the first network when the event occurs or transmitting the measurement report to the first network periodically.

13. The method of claim 9, further comprising:
receiving the first plurality of ciphered data blocks by a PDCP entity of the first communication device;
setting Next_PDCP_RX_SN and RX_HFN of the PDCP entity to initial values when the first communication is configured to release the communication path; and
receiving the second plurality of ciphered data blocks and deciphering the ciphered data blocks with the Next_PDCP_RX_SN and RX_HFN by the PDCP entity of the first communication device, after setting.

14. The method of claim 9, further comprising:
performing a first header decompression to the first plurality of data blocks by a PDCP entity of the first communication device;
resetting header compression protocol of the PDCP entity when the first communication device is configured to release the communication path; and
performing a second header decompression to the second plurality of data blocks by the PDCP entity of the first communication device after resetting.

15. The method of claim 9, further comprising:
transmitting a first status report to the first network, wherein the first status report includes information indicating which data blocks are not received successfully before releasing the communication path, whereby the first network transmits the first status report or a second status report includes the information to the second communication device, or to a second network of the wireless communication system connected to the second communication device; and
receiving the second plurality of data blocks including at least one data block belonging to the first plurality data blocks which has not been successfully received before releasing the communication path.

* * * * *